June 20, 1933.  C. C. WORTHINGTON  1,914,590
LOCK WASHER
Filed March 25, 1930
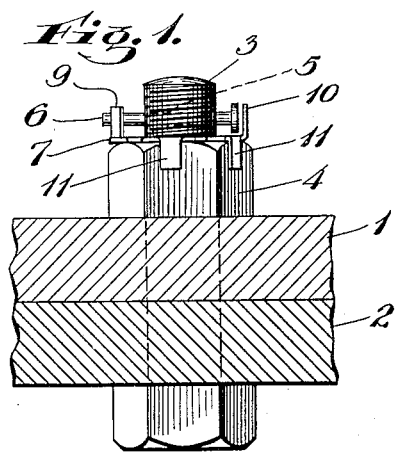
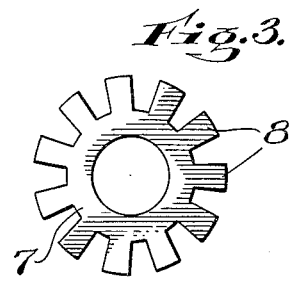
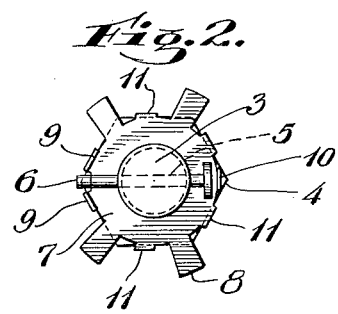
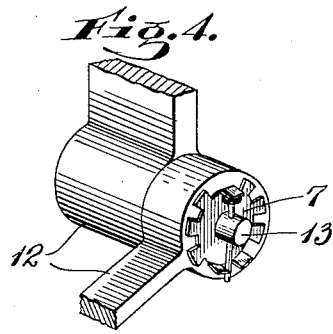
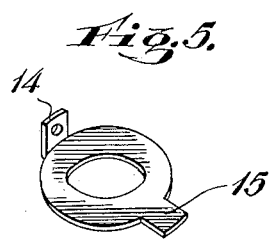
INVENTOR.
Charles C. Worthington
BY
Jeffery Kimball Eggleston
ATTORNEYS.

Patented June 20, 1933

1,914,590

UNITED STATES PATENT OFFICE

CHARLES C. WORTHINGTON, OF DUNFIELD, NEW JERSEY

LOCK WASHER

Application filed March 25, 1930. Serial No. 438,665.

The object of the invention is a substitute for the common cotter pin as used for securing nuts against backing off their bolts and for like purposes and consists in an interlocking pin and washer combination organized to fulfill all of such purposes without the disadvantages inherent in split-pins, such as difficulty of removal and of re-insertion. It contemplates generally a washer adapted to be passed over a bolt or the like and located as usual with respect to a nut or some other member and to be locked against removal by a pin passing through or projecting from the bolt, which pin is itself retained in place by the washer. The principle of organization is capable of embodiment in several different practical forms, as will presently be made apparent.

In the accompany drawing, Fig. 1 is an elevation of a preferred form of the invention used for locking a hex nut, Fig. 2 a plan of the same, Fig. 3 an elevation of the washer before being bent, Fig. 4 a perspective view of a different application of the invention and Fig. 5 one of the other possible forms of the invention.

In Figs. 1 and 2, numerals 1 and 2 indicate two members intended to be united by a bolt 3 and nut 4. The bolt has a transverse hole 5, which may be the usual cotter hole and which preferably passes clear through the bolt adjacent the nut but far enough above it to leave the hole clear for the insertion of a pin 6 above washer 7. If the hole is drilled all the way through the bolt, the pin is preferably headed or deformed in any suitable way to limit its movement into the hole. An ordinary wire nail will serve the purpose, which is merely to block movement of the washer on the bolt.

The washer can be variously designed to accomplish the desired result but in any event is a sheet metal disc stamped out of ordinary rolled sheet metal stock with an appropriate bolt opening which may be considerably larger than the bolt if desired, since the washer has no direct locking connection with the bolt. In the preferred form illustrated in Fig. 3, the periphery of the disc is formed with a plurality of bendable tabs 8, two of which (marked 9 in Figs. 1 and 2) are bent up one on each side of the pin so as to engage the same laterally or sufficiently close to it to prevent or limit rotation of the washer on the bolt. Another of the tabs (10 in Figs. 1 and 2) is bent up so as to overlie the head of the pin and obstruct its withdrawal from the hole, and the tabs are so related on the body of the disc, in this form, that when the end of the pin registers with the notch between two tabs, the head of the pin registers with the center of a tab, i. e. there is an odd number of tabs on the disc. In this way the interlocked pin and washer prevent the nut from backing off the bolt, except to the extent of any lost motion that may be present before the nut backs the washer against the pin, and even this motion, usually slight, may be prevented if desired, by bending downwardly or in a reverse direction, one or more of the remaining tabs (11 in Figs. 1 and 2) into engagement with the adjacent nut faces, so that in the result, the bolt, washer and nut are all interlocked against relative rotation.

As will be apparent, it is not necessary to repeat all of these operations if the nut is to be removed and replaced, for the reason that by bending down tab 10, the pin can be withdrawn, thereby permitting removal of the washer, and the unscrewing of the nut and in reassembling these steps are reversed and the parts again locked by bending tab 10 back to the position shown over the head of the pin. In the event of a particular head tab, or any of the other tabs, being broken or badly deformed from repeated bending, it is a simple matter to change the position of the washer relative to the pin and make use of other tabs previously idle, and for this reason it is preferred to make the device with a continuous series of tabs all around its circumference.

The washer can be applied to any of the purposes for which cotter pins are ordinarily employed. Fig. 4 illustrates a hinge joint between two members 12 through the knuckles of which passes a bolt member or stud 13 held in place by means of a similarly interlocked pin and washer instead of the usual cotter. Inasmuch as no nut is used in this joint the washer tabs are bent into engagement with the pin only.

In the form of Fig. 5 a single tab 14, apertured to receive the projecting end of the pin, serves the same purpose as the two tabs 9 of Fig. 4 and the diametrically opposite tab 15 when bent up prevents removal of the pin, as before.

Having now described my invention, I claim:

1. The combination with a bolt member having a hole therein, of a washer on said member, a pin located in said hole and projecting therefrom to block movement of the washer longitudinally of said member, and an interlock between the pin and washer comprising means carried by the washer arranged to limit the rotation of the washer relatively to the bolt member and prevent withdrawal of the pin from said hole.

2. The combination with a bolt member having a transverse hole therein, of a washer on said member, and a pin located in said hole and projecting therefrom to block movement of the washer, the latter having an upstanding portion for lateral engagement with the pin to obstruct rotation of the washer on the bolt member and a second upstanding portion adapted to overlie the end of the pin and obstruct withdrawal of the pin from the hole.

3. The combination with a bolt member having a transverse hole therethrough, of a washer on said member and a headed pin passing through said hole and projecting therefrom to block movement of the washer, the latter having two bent-up tabs for lateral engagement with the pin one on each side thereof, to obstruct rotation of the washer on the bolt member and a bent-up tab adapted to overlie the pin-head and obstruct withdrawal of the pin from the hole.

4. The combination with a bolt and nut, the former having a pin hole therethrough adjacent the nut, a washer on said bolt intermediate the nut and the hole, and a headed pin passing through the hole and projecting therefrom to block movement of the washer, the latter having an upstanding portion for lateral engagement with the pin to prevent rotation of the washer on the bolt, a second upstanding portion adapted to overlie the pin head, and a reversely bendable portion engageable with the nut faces, whereby bolt, washer and nut may be interlocked against relative rotation.

In testimony whereof, I have signed this specification.

CHARLES C. WORTHINGTON.